United States Patent Office 3,745,192
Patented July 10, 1973

3,745,192
LOW MOLECULAR WEIGHT HALOGEN-CONTAINING COPOLYMERS
Frank Wingler, Leverkusen, and Herbert Bartl, Odenthal-Hahnenberg, Germany, assignors to Bayer Aktiengesellschaft, Leverkusen, Germany
No Drawing. Filed Mar. 11, 1970, Ser. No. 18,719
Claims priority, application Germany, Mar. 27, 1969, P 19 15 682.2
Int. Cl. C07c 41/06, 43/00, 43/14
U.S. Cl. 260—615 P          4 Claims

ABSTRACT OF THE DISCLOSURE

Copolymers with a molecular weight of from 300 to 3,000, a chlorine content and/or bromine content of from 40 to 80% by weight and an OH number of from 20 to 200 and process of producing the same.

---

This invention relates to a process for the production of low molecular weight halogen-containing copolymers (telomers) which have a high level of compatibility with organic solvents, monomers, coating materials, synthetic resins and their starting materials.

Halogen-containing polymers, such as polyvinyl chloride, polyvinylidene chloride and polychloroprene, show an outstanding resistance to weather coupled with limited flammability. Accordingly, attempts have been made to improve the weather resistance and non-flammability of other plastics materials by mixing them with halogen-containing polymers. Unfortunately, this is possible only to a limited extent, because polyvinyl chloride cannot or can only in limited concentrations, be homogeneously mixed or dissolved in a number of organic solvents, coating materials, monomers, plastics or their starting materials. Another disadvantage is that solutions or mixtures containing conventional vinyl chloride polymers often have viscosities which are too high for further processing, or may form gels. In many instances, low molecular weight polyvinyl chloride, obtained for example by telomerisation in the presence of carbon tetrachloride, also shows inadequate compatibility and in addition has a tendency to gel with organic monomer solutions. In addition, the product is extremely brittle and accordingly is not suitable for the production of coating materials. Polyvinylidene chloride obtained by telomerisation in the presence of carbon tetrachloride is a substance which is solid at room temperature and which is insoluble in almost every organic solvent and monomer.

According to U.S. patent specification No. 2,440,800, halogen-containing telomers can be obtained by polymerizing ethylene in halogen-containing hydrocarbons at pressures above atmospheric pressure, preferably at pressures of from 20 to 1000 atms., and at elevated temperatures, preferably at temperatures of from 50 to 150° C., with the aid of peroxidic compounds. Unfortunately, the process has the disadvantage that it can only be carried out in expensive polymerization vessels which have to withstand high pressures, and that the halogen-containing regulators lead to considerable corrosion at the relatively high temperatures employed.

It has now been found that a low molecular weight halogen-containing copolymer can be prepared at a temperature below 60° C., preferably at a temperature from 0 to 55° C., and at a relatively low pressure, preferably at a pressure of from 2 to 50 atms., using a comomer containing OH groups. It is possible in this way to obtain halogen-containing copolymers, containing up to 40% by weight of incorporated monomers with OH groups, which are distinguished by their outstanding compatibility, especially with starting materials containing OH groups, for the production of lacquers, synthetic resins and foam plastics.

Accordingly, the present invention relates to a process for the production of a low molecular weight halogen-containing α-olefin copolymer with an average molecular weight of from about 300 to 3000, preferably 300 to 1000, a halogen content of from 40 to 80% by weight, an OH number of from 20 to 200, at a temperature below 60° C. and at superatmospheric pressure in the presence of a halogen-containing regulator and a radical former, in which 100 parts by weight of a halogen-containing α-olefin,
8 to 300 parts by weight of ethylene and/or propylene, α-butylene or isobutylene, and
10 to 100 parts by weight of an olefinically unsaturated copolymerizable monomer containing OH groups are copolymerized in the presence of 2 to 500 parts by weight of a halogen-containing regulator.

The invention also relates to the α-olefin copolymers containing halogen obtained by the process according to the invention.

Preferred copolymers have a molecular weight of from 300 to 3000, preferably 300 to 1000, a chlorine and/or bromine content of from 40 to 80% by weight, an OH number of from 20 to 200 and comprise compolymerized units of 5 to 35% by weight of ethylene and/or propylene, α-butylene or isobutylene,
30 to 85% by weight of vinyl chloride, vinylidene chloride, vinyl-bromide or vinylidene bromide,
5 to 40% by weight of trimethylol propane monoallyl ether, β-hydroxypropyl methacrylate, hydroxymethyl norbornene, ethylene glycol monovinyl ether or ethylene glycol monoallyl ether, and
5 to 50% by weight of terminal groups derived from carbon tetrachloride, methylene chloride, chloroform, bromoform, or tetrabromomethane as telogen.

Compounds of the formula:

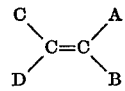

may be used as halogen-containing α-olefine. In this formula, A may represent fluorine, chlorine or bromine, B may represent hydrogen, fluorine, chlorine or bromine, and C and D which may be the same or different, represent hyrdogen atoms, alkyl groups or haloalkyl groups.

It is preferred to use vinyl chloride, vinylidene chloride, vinyl bromide or vinylidene bromide. The halogen-containing α-olefins may be used either individually or in admixture with one another.

Ethylene and/or propylene, isobutylene or α-butylene is added to the polymerization mixture or introduced under pressure during polymerization in such a quantity that the completed polymer contains from 5 to 35% by weight of ethylene and/or propylene, isobutylene or α-butylene in copolymerized form.

Suitable copolymerizable monomers containing OH groups include, for example, allyl alcohol, phenylallyl alcohol, isoprene alcohol, hydroxymethyl norbornene, dihydroxymethyl norbornene, hydroxyalkyl esters of acrylic and methacrylic acid, such as hydroxypropyl methacrylate and hydroxybutyl methacrylate, trimethylol propane monoacrylic acid esters, trimethylol propane monoallyl ether, monovinyl or monoallyl ethers of polyhydric alcohols such as glycol monovinyl or monoallyl ether, and monohydroxyalkyl or dihydroxyalkyl esters of maleic acid, fumaric acid, crotonic acid or itaconic acid, such as di-(β-hydroxyethyl) maleate and di-(β-hydroxyethyl) fumarate.

The telomers containing OH groups are distinguished by their particularly high compatibility with other compounds containing OH groups, for example polyester polyols and polyether polyols.

Suitable halogen-containing regulators include the conventionally used telogens, such as the halohydrocarbons: carbon tetrachloride; chloroform; methylene chloride; monochlorotrifluoromethane; dichlorodifluoromethane; monobromotrifluoromethane; difluoromonochlorobromomethane; difluorodibromomethane; monochloromonobromomethane; tetrachloroethylene; hexachloroethane; tetrabromomethane; bromoform; dibromomethane; hexachlorocyclopentadiene; hexabromocyclododecane; tetrabromoethane; tetrafluoro-1,2-dibromomethane; chlorinated alcohols, such as monochloroethanol, chloromethyl glycol, trichloroethanol and tribromoethanol; carbonyl compounds, such as chloral and dibromoacetone; monochloro- or dichloro-diethyl ether; and esters of trichloroacetic acid such as glycol monotrichloracetate. It is preferred to use carbon tetrachloride, chloroform, methylene chloride, bromoform or tetrabromomethane.

Technically, the process according to the invention is easy to control. At polymerization temperatures below 60° C., there are no signs of decomposition in the halogen-containing regulators or the polymers. By contrast, at temperatures above 60° C., dark-coloured polymers are obtained which, because of their natural colour, are no longer suitable for the production of lacquers or coating materials.

Polymers obtained at pressures in excess of 50 atms., are undesirable because they contain too much ethylene, propylene, isobutylene or α-butylene in the copolymer. The halogen content then falls below 40% by weight. At the same time, the products become increasingly incompatible with organic solvents, monomers, lacquers, synthetic resins or plastics or their starting materials.

The halogen-containing polymers can be prepared by bulk, precipitation or solution polymerization. They are preferably prepared in solution in organic solvents which are compatible both with the monomers and with the polymer. Solvents of this kind include preferably aromatic hydrocarbons such as benzene, toluene and xylene; and ethers such as dioxan, tetrahydrofuran, glycol dimethyl ether and dibutyl ether. Other suitable solvents include alcohols; esters such as alkyl acetate and ethyl glycol acetate; ketones such as acetone, methyl ethyl ketone and methyl isobutyl ketone; and halogen compounds, such as methylene chloride and chlorobenzene.

The regulators are used in quantities of from 2 to 500 parts by weight per 100 parts by weight of halogen-containing monomer. In a preferred embodiment, the regulator, for example carbon tetrachloride, is also used as solvent. Since in telomerisation reactions the regulator is incorporated in the polymer, it is possible to produce polymers with defined terminal groups. The telomers contain from 5 to 50% by weight of incorporated telogen. The incorporation of halogen-containing regulators in the polymer makes a considerable contribution towards improving the compatibility with other organic compounds.

The polymer should have a halogen content of from 40 to 80% by weight. If the polymer has a lower halogen content, it is less compatible with other organic compounds. It is preferred to use from 8 to 300 parts by weight of ethylene and/or propylene, isobutylene or α-butylene per 100 parts by weight of halogen-containing α-olefin. Polymerization is carried out, while stirring or rolling in a pressure vessel, at a pressure of from 2 to 50 atms., preferably at a pressure of from 5 to 30 atms.

Suitable polymerization initiators include compounds which yield radicals at temperatures below 60° C. and which have a half-life of at most 15 hours at 60° C., for example, azodiisobutyronitrile; peroxydicarbonates, such as dicyclohexyl peroxydicarbonate and isopropyl peroxydicarbonate; lauroyl peroxide; acetyl peroxide; dichlorobenzoyl peroxide; tert-butyl pivalate; Redox systems consisting of an oil-soluble peroxidic compound and a reducing agent, such as a transition metal salt, amine, sulphonic acid or reductone; and bororganyls, which may also be used in conjunction with oxygen; peroxides or hydrogen peroxide. The initiators are advantageously used in quantities of from 0.1 to 5% by weight, based on the monomer mixture.

Unreacted monomer, solvent, residual telogen and low-boiling oligomers can be removed on completion of polymerization, for instance by distillation, thin-layer or falling-film evaporation, spray-drying, steam distillation or treatment in an evaporator screw. Stabilisers, buffering substances, fillers, pigments or dyes may be added to the reaction mixtures before or after polymerization.

The telomers obtained by the process according to the invention are soluble in almost every common organic solvent, for example in aromatic solvents such as benzene, toluene, xylene, decahydronaphthalene or chlorobenzene; in esters such as alkyl acetates and glycol acetate; in ethers such as tetra hydrofuran, dioxan and glycol monoalkyl or dialkyl ethers; in ketones such as acetone, methyl ethyl ketone and methyl isobutyl ketone; in halohydrocarbons, for example tetrachloromethane, methylene chloride, chloroform, trichlorethylene and tetrachlorethane; in starting materials of the kind used in the production of plastics; synthetic resins, lacquers and foam plastics, such as polyisocyanates, polyesters or polyether polyols, polyepoxides and polyamines; in lacquers based on organic polymers, for example acrylates styrene copolymers; in alkyd resins; and in olefinically unsaturated monomers, such as styrene, α-methyl styrene, acrylonitrile, methacrylonitrile, vinyl chloride, vinylidene chloride, vinyl acetate or propionate, alkyl esters of acrylic and methacrylic acid, and derivatives of norbornene.

The copolymers acording to the invention are usually liquid to Vaseline-like or viscous at room temperature and have a viscosity number of from 0.01 to 0.2 dl./g., as measured at 25° C. in cyclohexanone. They have an average molecular weight of from 300 to 3000, preferably 300 to 1000, as measured by the osmometric method.

The telomers are valuable starting materials for the production of plastics, synthetic resins, lacquers, coating materials, adhesives, adhesion promoters and foams. They may be used as plasticisers for polyvinyl chloride or as extender oils both for synthetic resins and for elastomers.

The percentages given in the examples are percent by weight unless otherwise indicated.

EXAMPLE 1

A mixture of 20 litres of carbon tetrachloride, 6.7 kg. of vinyl chloride, 2.0 kg. of trimethylol propane monoallyl ether and 150 g. of cyclohexyl peroxydicarbonate, is prepared in a pressure vessel. 6 litres of this mixture are pumped into a 40-litre autoclave, heated to 50° C. and ethylene is introduced up to a pressure of 24 atms. The rest of the mixture is then introduced under pressure into the polymerization autoclave over a period of 12 hours, the inner pressure being kept constant at 24 atms. of ethylene. For working up, the mixture is separated by suction filtration from the insoluble constituents, and freed from solvent in a rotary evaporator, and the residue is treated in a falling-film evaporator at 150° C./0.1 mm. Hg. 8.0 kg. of a honey-like polymer with an OH number of 100, a chlorine content of 44% by weight and an average molecular weight of about 800 are obtained. The polymer contains copolymerized units of 47.6% of vinyl chloride, 17.2% of ethylene, 16.5% of trimethylol propane monoallyl ether and 19.3% of carbon tetrachloride as telogen. The polymer is compatible, in any ratio, with a trimethylol propane/propylene oxide condensation product having an OH number of 300.

EXAMPLE 2

The procedure is as in Example 1 except that hydroxymethyl norbornene is used. Working up in the same way gives 7 kg. of a Vaseline-like copolymer with a chlorine content of 50% by weight, a viscosity of 0.03 dl./g. (measured at 25° C. in cyclohexanone) and an OH number of 52. The substance melts at 40° C. to form a honey-like liquid. The copolymer is compatible with a trimethylol propane/propylene oxide condensation product of OH number 300. The polymer contains copolymerized units of 55.2% of vinyl chloride, 12.5% of ethylene, 12.3% of hydroxymethyl norbonene and 20% of carbon tetrachloride as telogen. Molecular weight about 820.

EXAMPLE 3

A mixture of 3 litres of methylene chloride, 1 kg. of vinyl chloride, 250 g. of glycol monoallyl ether and 30 g. of cyclohexylsulphonyl peracetate is heated with stirring for 5 hours at 30° C. at an ethylene pressure of 24 atms. in a 6-litre capacity autoclave, and then stirred for 20 hours at 35° C. The ethylene pressure is kept at 24 atms. The resulting solution, which has a solids content of 22% by weight, is thickened to a solids content of 55% in a rotary evaporator. The solids component has a chlorine content of 45% by weight. The solution has an OH number of 53. The polymer contains copolymerized units of 67.3% vinyl chloride, 6.6% of ethylene, 17.6% of glycol monoallyl ether and 8.5% of methylene chloride as telogen. Molecular weight about 1000. When mixed with an equimolar quantity of toluylene diisocyanate or hexamethylene diisocyanate, it is possible to obtain a coating adhering to glass or metal panels after drying at 50° C. The lacquer film is highly glossy and resistant to scratching and to solvents.

EXAMPLE 4

3 litres of carbon tetrachloride, 1 kg. of vinyl chloride, 150 g. of hydroxypropyl methacrylate and 15 g. of cyclohexyl peroxydicarbonate are introduced into a 6-litre autoclave filled with pure nitrogen. Ethylene is introduced with stirring at room temperature up to a pressure of 24 atms. and the contents of the autoclave are heated to 50° C. The pressure is kept constant at 24 atms. during the 12 hours taken for polymerization. The product is filtered off from the solid residue comprising a homotelomer of hydroxypropyl methacrylate, and the liquid phase is worked up at already described. A viscous copolymer with an OH number of 40 and a molecular weight of about 800 is obtained in a yield of 1 kg. This copolymer has a chlorine content of 54% by weight. The polymer contains copolymerized units of 65% of vinyl chloride, 5.7% of ethylene, 10% of hydroxypropyl methacrylate and 19.3% of carbon tetrachloride as telogen.

EXAMPLE 5

3 litres of carbon tetrachloride, 1 kg. of vinyl chloride, 330 g. of propene, 300 g. of trimethylol propane monoallyl ether and 20 g. of cyclohexyl peroxydicarbonate are introduced into a 10-litre autoclave. The mixture is polymerized for 12 hours at 50° C. with stirring and the polymer is subsequently freed from solvent and oligomers by distillation in a falling-film evaporator at 150° C./1 mm. Hg. A Vaseline-like copolymer containing 48% by weight of chlorine and with an OH number of 110 is obtained in a yield of 1400 g. The polymer contains copolymerized units of 38.2% of vinyl chloride, 26.8% of propene, 17% of trimethylol propane monoallyl ether and 18% of carbon tetrachloride as telogen. Molecular weight about 910.

EXAMPLE 6

500 cc. of bromoform, 2 litres of toluene, 20 g. of cyclohexyl peroxydicarbonate, 300 g. of trimethylol propane monoallyl ether and 1 kg. of vinyl chloride are introduced into a 6-litre capacity autoclave filled with ultrapure nitrogen. Ethylene is introduced while stirring at room temperature up to a pressure of 10 atms. and the contents of the autoclave are heated to 50° C. The pressure is kept constant throughout the entire polymerisation period of 12 hours. The polymer solution is then freed from solvent in a rotary evaporator and separated from oligomers by thin-layer distillation. 100 g. of an oily polymer with a chlorine content of 19% by weight, a bromine content of 37% by weight, an OH number of 80 and a molecular weight of about 660 are obtained. The polymer contains copolymerized units of 33.8% of vinyl chloride, 8.2% of ethylene, 20% of trimethylol propane monoallyl ether and 38% of bromoform as telogen.

EXAMPLE 7

The following mixture is polymerized for 12 hours at 40° C. with stirring at an ethylene pressure of 25 atms. in a 3-litre capacity autoclave; 500 cc. of vinyl bromide, 200 cc. of bromoform, 1000 cc. of carbon tetrachloride, 100 g. of glycol monovinyl ether and 10 g. of 2,4-dichlorobenzoyl peroxide. After working up in the usual way in a thin-layer evaporator, at 120° C./0.1 mm. Hg, 900 g. of a viscous copolymer with a bromine content of 75% by weight, an OH number of 80 and a molecular weight of about 930 are obtained. The polymer contains copolymerized units of 55.4% of vinyl bromide, 5% of ethylene, 12.6% of glycol monovinyl ether and 27% of bromoform as telogen.

We claim:

1. An α-olefin copolymer with a molecular weight of from 300 to 3,000, a chlorine, bromine or chlorine and bromine content of from 40 to 80% by weight and an OH number of from 20 to 200 consisting essentially of 5 to 35% by weight of ethylene, propylene, a mixture of ethylene and propylene, α-butylene or isobutylene, 30 to 85% by weight of vinyl chloride, vinylidene chloride, vinyl bromide or vinylidene bromide, 5 to 40% by weight of trimethylol propane monoallyl ether, glycol monovinyl ether or glycol monoallyl ether and 5 to 50% by weight of terminal groups derived from carbon tetrachloride, methylene chloride, chloroform, bromoform or tetrabromomethane as telogen.

2. The α-olefin copolymer of claim 1 having from 30 to 85% by weight of vinyl chloride.

3. The α-olefin copolymer of claim 1 having from 5 to 50% by weight of terminal groups derived from carbon tetrachloride as telogen.

4. The α-olefin copolymer of claim 1 having from 5 to 35% by weight of ethylene, 30 to 85% by weight of vinyl chloride, 5 to 40% by weight of trimethylol propane monoallyl ether and 5 to 50% by weight of terminal groups derived from carbon tetrachloride as telogen.

References Cited

UNITED STATES PATENTS

| | | | |
|---|---|---|---|
| 2,440,800 | 5/1948 | Hanford et al. | 260—658 C |
| 2,516,928 | 8/1950 | Swern | 260—615 RX |
| 2,585,035 | 2/1952 | Roach et al. | 260—615 RX |
| 2,748,170 | 5/1956 | Benoit et al. | 260—615 RX |
| 2,831,843 | 4/1958 | Seymour | 260—658 C |
| 2,833,808 | 5/1958 | Brendlein | 260—658 C |
| 2,834,766 | 5/1958 | Hayt | 260—615 P |
| 3,323,942 | 6/1967 | Calfee | 260—615 P |
| 3,429,901 | 2/1967 | Blood et al. | 260—658 CX |

HOWARD T. MARS, Primary Examiner

U.S. Cl. X.R.

117—124 D, 127, 137; 260—77.5, 80.75, 80.76, 484 R, 486 H, 617 F